(12) United States Patent
Mansur et al.

(10) Patent No.: US 9,346,460 B2
(45) Date of Patent: May 24, 2016

(54) ALL-WHEEL-DRIVE SYSTEM INTERACTION WITH FUEL SAVINGS OPERATION OF A MOTOR VEHICLE

(71) Applicant: FORD GLOBAL TECHNOLOGIES, LLC, Dearborn, MI (US)

(72) Inventors: William N. Mansur, West Bloomfield, MI (US); Mark D. Malone, Canton, MI (US); Tuan A. Be, Livonia, MI (US); Ahmed Awadi, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 129 days.

(21) Appl. No.: 14/217,690

(22) Filed: Mar. 18, 2014

(65) Prior Publication Data

US 2015/0266467 A1 Sep. 24, 2015

(51) Int. Cl.
| | |
|---|---|
| *B60W 20/00* | (2016.01) |
| *B60K 23/08* | (2006.01) |
| *B60K 17/34* | (2006.01) |
| *F02N 11/08* | (2006.01) |
| *B60W 10/06* | (2006.01) |
| *B60W 10/119* | (2012.01) |
| *B60W 50/14* | (2012.01) |
| *B60W 30/182* | (2012.01) |

(52) U.S. Cl.
CPC .............. *B60W 20/20* (2013.01); *B60W 10/06* (2013.01); *B60W 10/119* (2013.01); *B60W 20/10* (2013.01); *B60W 20/106* (2013.01); *B60W 20/40* (2013.01); *B60W 30/182* (2013.01); *B60W 50/14* (2013.01); *B60K 17/34* (2013.01); *B60K 23/08* (2013.01); *B60K 2023/085* (2013.01); *B60W 2550/12* (2013.01); *B60W 2550/13* (2013.01); *B60W 2550/141* (2013.01); *B60W 2550/142* (2013.01); *B60W 2550/147* (2013.01); *B60W 2550/148* (2013.01); *F02N 11/0833* (2013.01); *Y10S 903/93* (2013.01)

(58) Field of Classification Search
CPC ............. B60K 17/35; B60K 2023/0858; F02N 11/0837; F02N 11/084
See application file for complete search history.

(56) References Cited

U.S. PATENT DOCUMENTS

| | | | |
|---|---|---|---|
| 6,684,970 B2 | 2/2004 | Gotou | |
| 9,002,560 B2* | 4/2015 | Hasegawa | B60K 6/445 701/22 |
| 2007/0051552 A1 | 3/2007 | Reed | |
| 2010/0175936 A1 | 7/2010 | Schneider | |
| 2010/0250049 A1 | 9/2010 | Nihei et al. | |
| 2012/0293317 A1* | 11/2012 | Hanna | B60W 50/14 340/441 |
| 2014/0278019 A1* | 9/2014 | Be | F02D 29/02 701/112 |

* cited by examiner

*Primary Examiner* — Todd Melton
(74) *Attorney, Agent, or Firm* — David B. Kelley; MacMillan, Sobanski & Todd, LLC

(57) ABSTRACT

A method for controlling vehicle powertrain operation includes activating all-wheel-drive or 4×4-operation provided one of an environmental condition, vehicle use condition and vehicle electrical condition exceeds a corresponding reference, deactivating fuel saving operation provided all-wheel-drive or 4×4-operation is activated, activating fuel saving operation provided none of said conditions indicates need for AWD/4×4-operation, deactivating all-wheel-drive or 4×4-operation provided fuel saving operation is activated.

15 Claims, 5 Drawing Sheets

ALL-WHEEL-DRIVE SYSTEM INTERACTION WITH FUEL SAVINGS OPERATION OF A MOTOR VEHICLE

BACKGROUND OF THE INVENTION

1. Field of the Invention

This invention relates generally to controlling a powertrain of a vehicle having all-wheel drive capability and an automatic engine stop-restart function.

2. Description of the Prior Art

Many of the vehicles that are equipped with an automatic stop-restart function are also being equipped with an All-Wheel Drive (AWD) powertrain or 4×4 powertrain, which is re-actuated either automatically or manually in response to customer selection. The automatic stop-restart function is a fuel saving strategy whereby a vehicle controller automatically turns the engine off when the vehicle is stopped and the engine is idling.

Other fuel saving strategies or systems may be fully or partially incompatible with AWD/4×4-operation. For example, while the vehicle's engine is auto-stopped, 4×4/AWD operation may be requested by the vehicle operator or by an automated system responding to vehicle usage, road, weather, or other operating conditions. When this occurs, system incompatibilities can arise if activation of off-road components occurs while the engine is off due to lack of available electrical energy or insufficient engine rotation or torque or if activation occurs immediately prior to an automatic stop-restart induced auto-restart. The energy required to operate high current components may be greater than available electrical thresholds required to support engine cranking concurrently with activation of high current AWD/4×4 mechanisms.

Even while the engine is running, it is beneficial to have the stop-restart function react to detection of AWD/4×4 activation or identification of a need for such activation so as to inhibit subsequent stop-restart actions in favor or supporting off-road operation and device activations.

The opposite is also true, it may be beneficial to favor fuel economy modes such as stop-restart actions when the AWD/4×4-operation is deactivated or conditions support deactivation of off-road operating modes.

SUMMARY OF THE INVENTION

A method for controlling vehicle powertrain operation includes activating all-wheel-drive or 4×4-operation provided one of an environmental condition, vehicle use condition and vehicle electrical condition exceeds a corresponding reference, deactivating fuel saving operation provided all-wheel-drive or 4×4-operation is activated, activating fuel saving operation provided none of said conditions indicates need for AWD/4×4-operation, deactivating all-wheel-drive or 4×4-operation provided fuel saving operation is activated.

The method deactivates all-wheel-drive and 4×4-operation when fuel saving operation is activated, such as automatic engine stop-restart operation and hybrid electric-only operation.

Conventionally any driver request for all-wheel-drive or 4×4-operation will continue to be executed until automatic engine stop-restart operation is completed. The method avoids that potential annoyance to the vehicle operator.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1A:
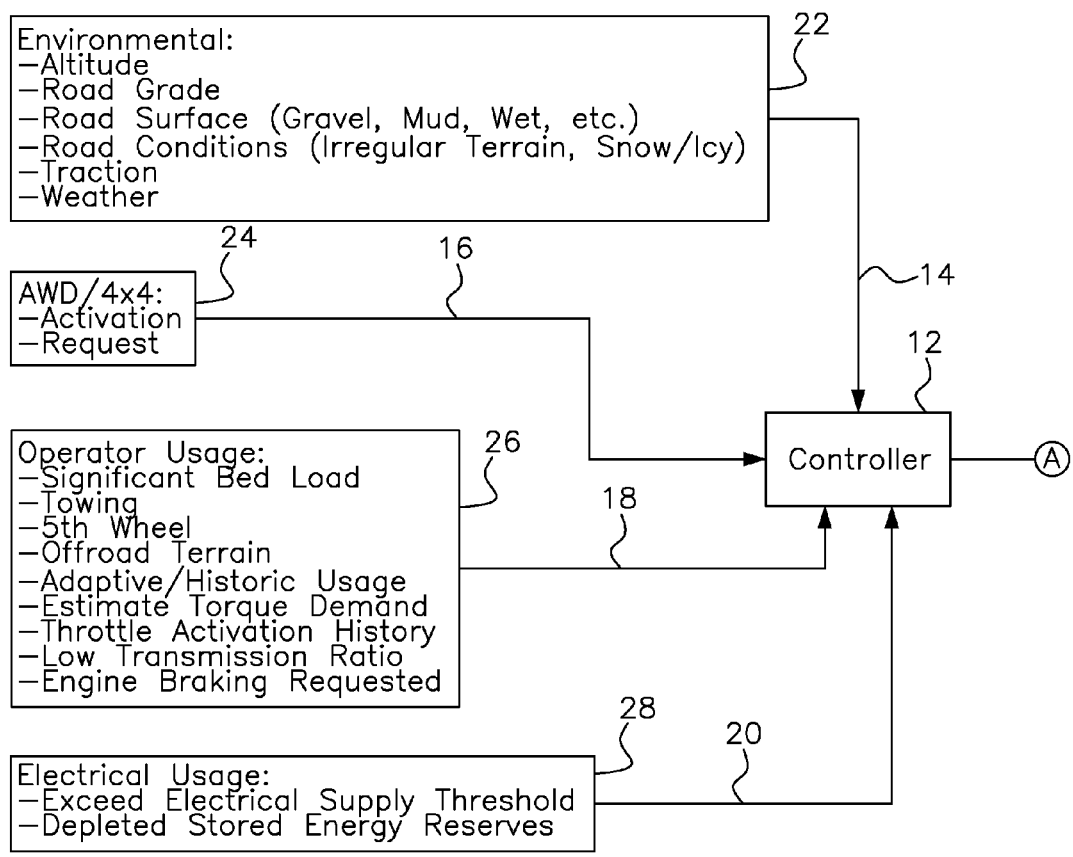
FIGS. 1A and 1B are a logic diagram for optimizing fuel economy of a vehicle equipped with a 4×4 or AWD powertrain.
Figure 1B:
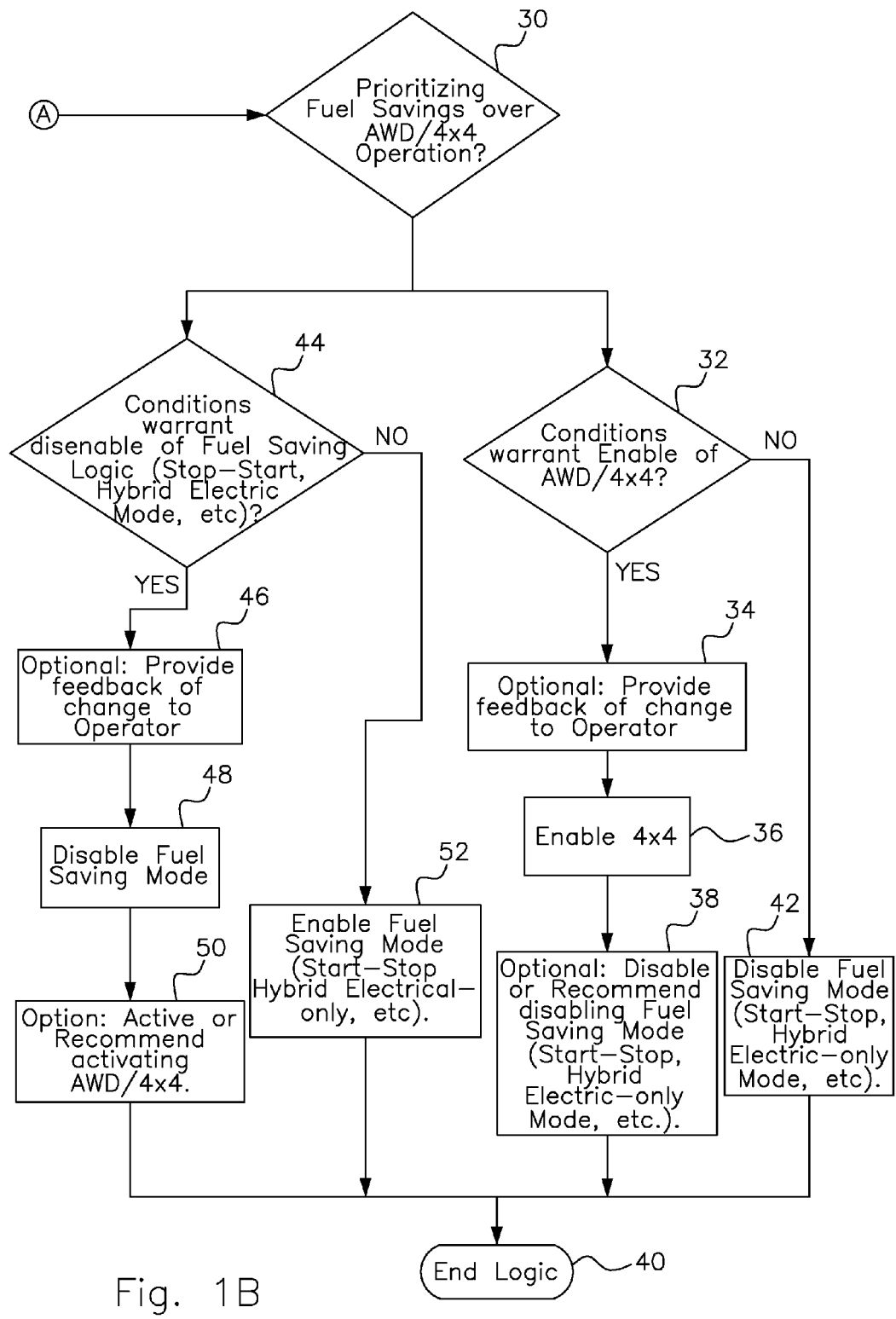

In FIGS. 1A and 1B, a controller 12, such an electronic microprocessor, receives various input signals 14, 16, 18, 20 representing the environment in which the vehicle is operating 22, the on/off state of a vehicle operator's request for 4×4 or AWD operation 24, vehicle conditions 26, and vehicle electrical usage and requirements 28.

The environmental conditions 22 may include, without limitation, altitude, road grade, material of the road surface (gravel, mud, wet), traction, condition of the road surface (irregular terrain, snow, ice, sand), and weather.

The vehicle conditions (operator usage) 26 may include, without limitation, significant bed load, towing load, fifth wheel attached to the vehicle and contacting the ground, off-road terrain, adaptive/historical vehicle usage, estimated torque demand, engine throttle activation history, low transmission speed ratio, and a state of requested engine braking.

The vehicle electrical usage and requirements 28 may include, without limitation, exceeding an electrical supply reference and depleted stored energy reserves in a battery.

Option 1:

An automatic engine stop/restart system is activated and deactivated based on the presence or absence of a request for AWD/4×4-operation. Most vehicles equipped with AWD/4×4 powertrain systems operate in an automatically-applied (AWD) manner, on-the-fly shift, or through use of a manually engaged lever. AWD/4×4-operation can be integrated inside controller 12, such as a Powertrain Control Module (PCM), Body Control Module (BCM), or other vehicle module. Alternatively, AWD/4×4-operation may be initiated from a separate module. Communication may occur through CAN or other messaging system that provides feedback signals to alert other modules that AWD/4×4-operation is activated or is desired to be activated.

Option 2:

An automatic engine stop/restart system is also activated and deactivated in response to a signal 18 indicating a need for AWD/4×4 operation based on road conditions and weather conditions. Automated examination of driving conditions 26, environmental conditions 22, and/or other available indications, such as might be provided by an anti-lock brake system (ABS), rain sensors, a traction control system, cold weather/icy road conditions, etc. can determine whether the enhanced traction provided by off-road AWD/4×4 systems is required.

At step 30 the control logic divides in two parts to establish whether current conditions would prioritize fuel savings over AWD/4×4-operation.

At step 32 a test is made to determine whether such conditions warrant activating AWD/4×4 automatic engine stop-restart operation.

If the result of test 32 is true or positive, at step 34, optional information regarding a change of vehicle operator is supplied to controller 12.

At step 36 if traction enhancement is required, AWD/4×4-operation is activated.

At step 38 deactivation of the fuel saving mode, which includes automatic engine stop-restart operation and hybrid electric-only mode, occurs or is recommended. The control logic is terminated at 40.

If the result of test 32 is false or negative indicating that such conditions are absent, deactivation of the fuel saving mode, which includes automatic engine stop-restart operation and hybrid electric-only mode, occurs at step 42, and the control logic is terminated at 40.

One or more of the following options determine whether driving conditions may warrant enabling AWD/4×4-operation and deactivating automatic engine stop-restart operation.

1. Environmental conditions may include indications of precipitation, detection of conditions for frosting or icing, wipers activated, heated windshield activated, or indications of off-road surface conditions such as operating on gravel, mud, wet, icy, etc.

2. Indications of operation in rough terrain, off-road, or mountainous conditions such as high altitude indication, road grade estimates or other angles of vehicle inclination such as indications of axial, longitudinal, yaw (rollover) angle, rapidly toggling between high levels of acceleration and deceleration.

3. The vehicle operator initiates a request for AWD/4×4-operation.

Option 3:

An automatic engine stop/restart system is also activated and deactivated in response to signal 20 indicating the capability of the vehicle's electrical system to support AWD/4×4-operation. If electrical power consumption governs whether automatic engine stop/restart-operation is activated, then knowledge of electrical load can be examined to determine whether to deactivate automatic engine stop/restart-operation. These actions may be decided by the powertrain controller 12 or in combination with the body/electrical controller and in reliance on information regarding current power consumption, status of active features and their energy consumption, and/or a strategy for managing loads during AWD/4×4 transitions to predict capability of supporting AWD/4×-operation. If electrical power demands or electric power references indicate that the vehicle is not capable of supporting these systems, then automatic engine stop-restart operation is deactivated at step 42.

A test is performed at step 44 to determine whether operating conditions warrant deactivating fuel saving logic including automatic engine stop-restart operation and hybrid electric-only operation. If the result of test 44 is positive, at step 46 optional information regarding a change in the vehicle operator is supplied as feedback to controller 12.

At step 48 fuel saving operation is deactivated.

At step 50 optional activation of AWD/4×4-operation occurs or is recommended, and the control logic terminates at step 40.

But if the result of test 44 is false or negative indicating absence of conditions requiring deactivation of fuel saving operation, activation of the fuel saving mode, which includes automatic engine stop-restart operation and hybrid electric-only mode, occurs at step 52, and the control logic terminates at step 40.

Figure 2:
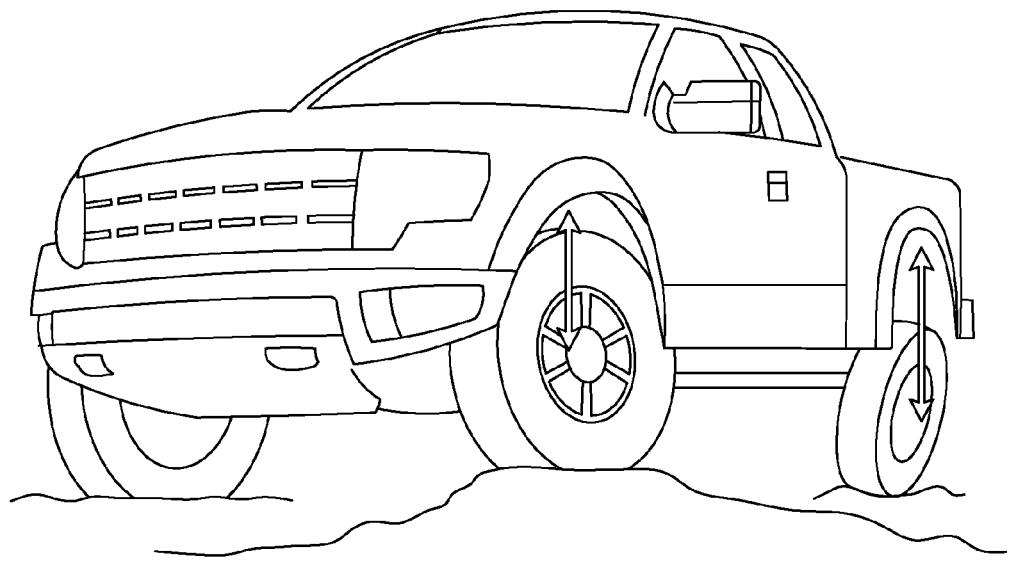
FIGS. 2 and 3 show examples of non-uniform suspension usage in light trucks.
Figure 3:
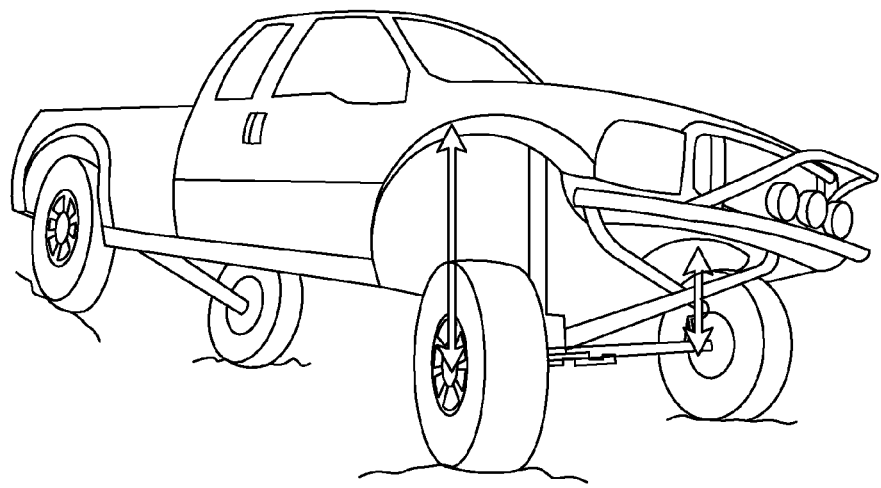

Option 4:

As illustrated in FIGS. 2 and 3, indications of non-uniform vehicle suspension usage are represented by air suspension indication of non-uniform displacement, torque, compression, height, angle, ground clearance indication, electronic suspension indication, and tire pressure monitoring indication of rear loading.

Figure 4:
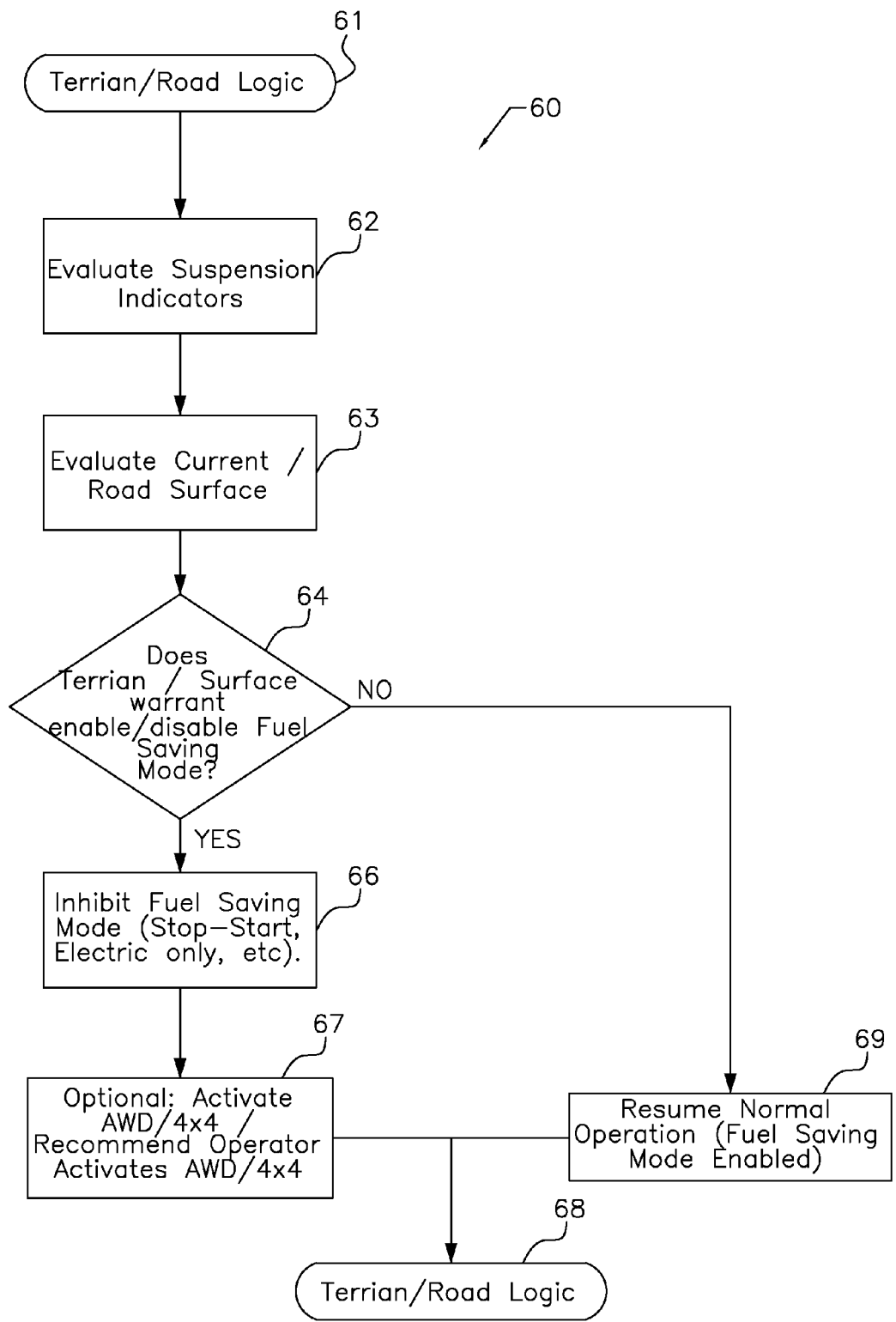
FIG. 4 is a logic flow diagram for control of a powertrain of a vehicle subject to non-uniform suspension use.

If any of the vehicle's wheels is out of position relative to one or more of the other wheels as a function of wheel height, wheel or suspension angle, in comparison to reference point, reference line or reference angle, or suspension tension, or shock travel, terrain/road control (shown by vertical arrows in FIGS. 2 and 3), logic 60 of FIG. 4 is enabled at 61.

At step 62 the vehicle suspension is evaluated in relation to suspension references, and at step 63 an estimate is made of the current terrain and road conditions. At step 64 a test is made to determine whether the current terrain and road conditions warrant deactivating fuel saving operation. If the result of test 64 is positive, at step 66 fuel saving operation is deactivated. At step 67 an optional signal representing a command to activate AWD/4×4-operation or to recommend its activation issues, and the control 60 terminates at 68.

If the result to test 64 is negative, at step 69 resumption of normal vehicle operation is commanded with the fuel saving operation activated, and the control 60 terminates at 68.

Figure 5:
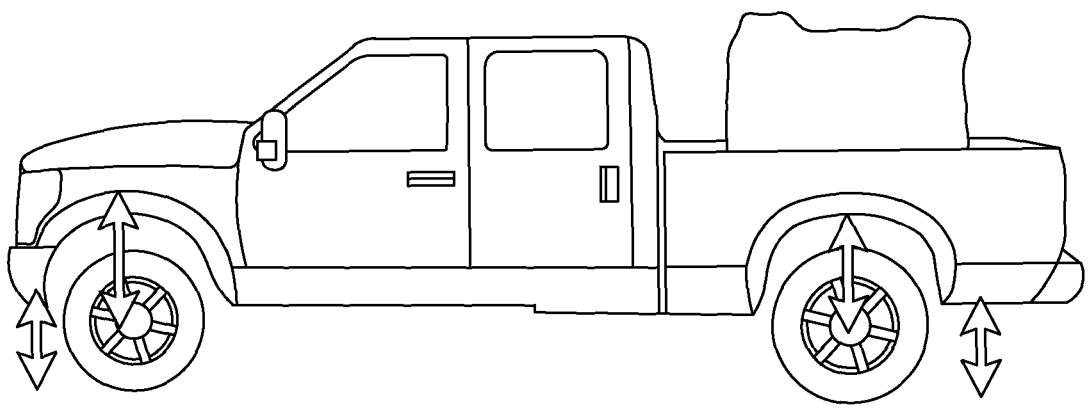
FIG. 5 shows examples of vehicle load indicators of a light truck.

Option 5:

FIG. 5 shows examples of vehicle load indicators that may include any or all of the following signal outputs: air suspension indication of rearward leveling, ground clearance indication, electronic suspension indication, tire pressure monitoring indication of rear loading, engine throttle-based indication, road grade indication of load, detection of trailer hitch or fifth wheel connection (indicated by arrows in FIG. 5). When the system detects heavy engine load, high vehicle mass, trailer in tow, heavy loading, heavy payload exceeding reference limits, fuel saving operation is deactivated at step 66 substantially as described with reference to steps 62-67 of FIG. 4, unless the result of test 64 is negative, in which case resumption of normal vehicle operation is commanded at step 69 with the fuel saving operation activated.

Option 6:

Fifth wheel contacting the ground indicators may include any or all of the following output signals: air suspension indication of rearward leveling, ground clearance indication, electronic suspension indication, tire pressure monitoring indication of rear loading, throttle-based indication, road grade indication of load, engine load-based indication, road grade indication of load, tow-in-progress indication, and trailer wiring attachment indication.

When the system detects vehicle operation with a fifth wheel contacting the ground fuel saving operation is deactivated at step 66 substantially as described with reference to steps 62-67 of FIG. 4, unless the result of test 64 is negative, in which case resumption of normal vehicle operation is commanded at step 69 with the fuel saving operation activated.

In accordance with the provisions of the patent statutes, the preferred embodiment has been described. However, it should be noted that the alternate embodiments can be practiced otherwise than as specifically illustrated and described.

The invention claimed is:

1. A method for controlling vehicle powertrain operation, comprising:

(a) activating AWD/4×4-operation provided one of an environmental condition, vehicle use condition and vehicle electrical condition exceeds a corresponding reference;
(b) deactivating a fuel saving operation provided the AWD/4×4-operation is activated;
(c) activating fuel saving operation provided none of said conditions indicates need for the AWD/4×4-operation;
(d) deactivating the AWD/4×4-operation provided fuel saving operation is activated.

2. The method of claim 1, wherein said environmental condition is one of altitude at which the vehicle is operating, grade of a surface on which the vehicle is located, a material of said surface, traction conditions of said surface, and current weather conditions.

3. The method of claim 1, wherein said vehicle use condition is one of vehicle cargo bed load, vehicle towing load, fifth wheel attached to the vehicle and contacting the ground, off-road terrain, adaptive/historical vehicle usage, estimated torque demand, engine throttle activation history, low transmission speed ratio, and state of requested engine braking.

4. The method of claim 1, wherein said vehicle electrical condition is one of current electric load of the vehicle, status of active electric systems of the vehicle, prediction of capability of supporting the AWD/4×4-operation, and a magnitude of electric energy reserve stored in a battery.

5. The method of claim 1, wherein said fuel saving operation includes automatic engine stop/restart-operation and hybrid electric-only operation of the powertrain.

6. The method of claim 1, wherein step (a) is executed provided a request for the AWD/4×4-operation is present.

7. The method of claim 1, wherein step (b) includes producing a warning representing a recommendation that the AWD/4×4-operation be activated.

8. The method of claim 1, wherein step (d) includes producing a warning representing a recommendation that fuel saving operation be activated.

9. A method for controlling vehicle powertrain operation, comprising:

(a) activating AWD/4×4-operation provided one of an environmental condition, vehicle use condition and vehicle electrical condition exceeds a corresponding reference, or in response to a request for the AWD/4×4-operation;
(b) deactivating a fuel saving operation provided the AWD/4×4-operation is activated;
(c) activating fuel saving operation provided none of said conditions indicates a need for the AWD/4×4-operation;
(d) deactivating the AWD/4×4-operation provided fuel saving operation is activated.

10. The method of claim 9, wherein said environmental condition is one of altitude at which the vehicle is operating, grade of a surface on which the vehicle is located, a material of said surface, traction conditions of said surface, and current weather conditions.

11. The method of claim 9, wherein said vehicle use condition is one of vehicle cargo bed load, vehicle towing load, fifth wheel attached to the vehicle and contacting the ground, off-road terrain, adaptive/historical vehicle usage, estimated torque demand, engine throttle activation history, low transmission speed ratio, and state of requested engine braking.

12. The method of claim 9, wherein said vehicle electrical condition is one of current electric load of the vehicle, status of active electric systems of the vehicle, prediction of capability of supporting the AWD/4×4-operation, and a magnitude of electric energy reserve stored in a battery.

13. The method of claim 9, wherein said fuel saving operation includes automatic engine stop/restart-operation and hybrid electric-only operation of the powertrain.

14. The method of claim 9, wherein step (b) includes producing a warning representing a recommendation that the AWD/4×4-operation be activated.

15. The method of claim 9, wherein step (d) includes producing a warning representing a recommendation that the fuel saving operation be activated.

* * * * *